Figure 1:
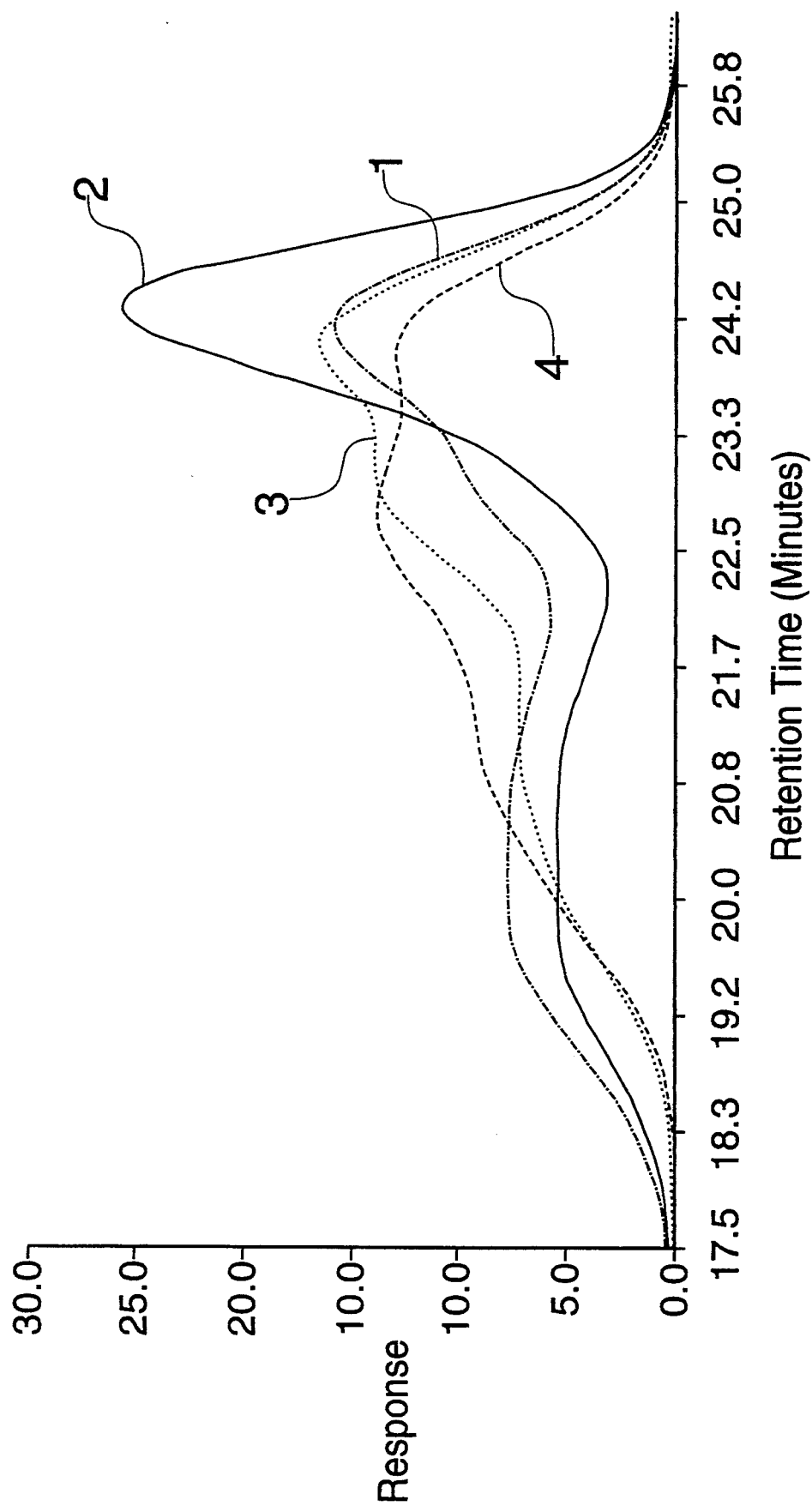

United States Patent [19]

Furcsik et al.

[11] Patent Number: 5,397,586
[45] Date of Patent: Mar. 14, 1995

[54] PASTA PRODUCTS

[75] Inventors: Susan L. Furcsik, Lake Station, Ind.; Carol A. Stankus; Robert B. Friedman, both of Chicago, Ill.

[73] Assignee: American Maize-Products Company, Stamford, Conn.

[21] Appl. No.: 45,556

[22] Filed: Apr. 9, 1993

[51] Int. Cl.6 .......................... A21D 8/00; A23L 1/16
[52] U.S. Cl. .................................. 426/549; 426/451; 426/557; 426/578
[58] Field of Search ................ 426/557, 451, 578, 549

[56] References Cited

U.S. PATENT DOCUMENTS

| | | | |
|---|---|---|---|
| 4,575,460 | 3/1986 | Alapi et al. | 426/557 |
| 4,590,084 | 5/1986 | Miller et al. | 426/557 |
| 4,774,328 | 9/1988 | Friedman et al. | 426/578 |
| 4,790,997 | 12/1988 | Friedman et al. | 426/578 |
| 5,004,864 | 4/1991 | Robertson et al. | 800/235 |
| 5,120,562 | 6/1992 | Furcsik et al. | 426/549 |
| 5,164,215 | 11/1992 | Furcsik et al. | 426/549 |

Primary Examiner—Donald E. Czaja
Assistant Examiner—Mary S. Mims
Attorney, Agent, or Firm—Lucas & Just

[57] ABSTRACT

An improved pasta product is made by incorporating an aedu starch, a duh starch or a mixture thereof in an amount of about 5% to about 50% by weight of farinaceous material. The pasta has improved texture and works well in retort, frozen foods, microwave foods and food service applications. The use of aedu starch and duh starch to improve the texture is also applicable to tortillas.

17 Claims, 1 Drawing Sheet

PASTA PRODUCTS

This invention relates to food and more particularly, to an improved formulation and process for making pasta products such as spaghetti, macaroni and noodles.

Pasta products are conventionally made by forming a paste or dough from flour and water, shaping the dough into a ribbon, cylinder, conduit or some other shape and then cooking the shaped dough. This shaping can be done by using conventional equipment such as extrusion with an extruder equipped with the appropriate die. If an egg is added to the dough and the dough formed into a ribbon, the finished product is typically referred to as a noodle or egg noodle. Optionally, other ingredients are also added to the dough such as flavoring or coloring. The fresh raw pasta is cooked, generally in boiling water, and then the cooked pasta product is drained before human consumption. Alternatively, the shaped dough is dried and sold to the consumer. Typically, the cooked product is consumed with a tomato-based sauce, a cream-based sauce or an oil-based sauce. Pasta products differ from other farinaceous products primarily by the fact that no leavening agent is added to the dough.

Pasta products are used in prepared and processed foods such as canned foods, frozen foods and chilled foods and by food service operations where the pasta product is subjected to extended periods of time on a steam table or other warming device. All of these processes require that the pasta be able to withstand less than ideal conditions for extended periods of time.

The texture of pasta products made from conventional ingredients, such as durum wheat flour and water, tends to deteriorate after long storage or extended processing. In the food service operation, pasta tends to become tacky and gummy and lose its structure after extended periods on the steam table. A solution has been to cook only small quantities of pasta and throw it out when its texture deteriorates. In the frozen foods area, the pasta is generally cooked, combined with meat and sauce, and then frozen so that it need only be heated in a microwave oven, a conventional oven, or by boiling in a bag. Due to the faster heating rate of the pasta compared to the meat or sauce, the pasta tends to become soft and gummy and lose its structure upon reheating. One solution to this has been to prepare the pasta in a separate bag from the sauce so that the two may be heated at different rates. A solution in the retort field suggested by U.S. Pat. No. 4,590,084 is the use of a high amylose corn starch, i.e. starch extracted from maize which is homogeneous in the recessive amylose extender gene, in conjunction with flour. It has been found, in some instances, that the use of a high amylose corn starch, aeae corn starch, produces a pasta product with a grainy mouth feel and a raw starch taste. This is because starch obtained from high amylose corn requires a high temperature and pressure to be thoroughly gelatinized or "cooked-out."

It is generally recognized that consumers prefer pasta products which have a firm bite. In culinary circles, food with a firm bite is generally referred to as "al dente" and is typical of Italian cuisine. In the fast-paced world of today, there is a need for pasta products which can provide al dente texture and withstand reheating after extended periods of frozen storage as well as other strains due to commercial food processing.

It has now been discovered that a pasta product formulated in accordance with the present invention has good texture and mouth feel even after being frozen and reheated. It has also been found that pasta products made in accordance with the present invention have good texture and mouth feel even after prolonged periods of storage on a steam table or the like. It has also been found that, upon heating in a microwave oven, the pasta product allows for neither loss of moisture nor the migration of water into the pasta product thereby preserving the al dense texture of the pasta product. This makes the pasta product made in accordance with the present invention especially well-suited for use in microwave food products.

Additionally, it has been found that the present invention works well in tortillas after they have been made, frozen and reheated in a microwave.

In accordance with the present invention on improved pasta product and/or tortilla product is made from a dough comprising a flour component and water, to which is added an effective amount of a novel starch selected from the group consisting of amylose extender dull (aedu) starch, dull horny (duh) starch and mixtures thereof, the amount being effective to improve the texture of the product. The amount of novel starch used in the dough is preferably about 5% to about 50% by weight based on the combined weight of the flour component and the novel starch, i.e. total weight of farinaceous material in the dough. More preferably, the amount of novel starch used in the dough formulation is about 10% to about 40% by weight of farinaceous material. Good results have been obtained by using the novel starch in an amount of about 15% to about 25% by weight of farinaceous material in the dough. The novel starches are used alone, i.e. just aedu starch or just duh starch, in the proposed amounts, e.g. 5–50%, 10–40% and 15–25%, or combined as a mixture to give a total amount of 5–50%, 10–40%, 15–25%. The percentages of novel starch used are dependent upon the total amount of flour component and novel starch used to form the dough.

Those of skill in the art will recognize that, when using a conventional formulation for a pasta product or tortilla, the novel starch of the present invention replaces a portion of the flour so as to provide improved texture to the pasta product or the tortilla. The preferred amount of flour replaced in the formulation is about 5% to about 50% by weight. More preferred is to use about 10% to about 40% by weight, and best results are achieved with about 15% to about 25% by weight.

FIG. 1 illustrates the portions of the debranched sample of aedu corn starch, duh corn starch, aeae corn starch 50% apparent amylose, and aeae corn starch 70% apparent amylose as separated by size exclusion chromatography.

The aedu starch employed in this invention may be obtained from a starch bearing plant with an amylose extender dull (aedu) homozygous genotype. The term aedu starch means not only starch obtained from a starch bearing plant that has an aedu homozygous genotype aeaedudu but also translocations, inversions and other variants that contain or that can be described as containing the aedu genotype. The amylose extender, ae, gene had been available only as a recessive gene. U.S. Pat. No. 5,004,864 discloses the discovery of a dominant amylose extender, AE, gene. Those of skill in the art will recognize that the dominant amylose extender gene may be used to obtain aedu starch.

Any plant source which produces edible starch and which can be crossbred to produce a plant having an aedu homozygous genotype may be used. It has been found that maize and barley have the mutant amylose extender (ae) gene while the dull (du) gene is obtained from cereal grains such as maize, rice, barley and sorghum. Maize is the preferred plant source. The ae gene is reported to be located on chromosome 5 of the maize chromosomes. See "Development Genetics," Volume 5, 1984, pages 1–24. The dull gene is reported to be located on chromosome 10 of the maize chromosomes.

Generally, to obtain a starch bearing plant with both double recessive mutants of the ae and du genotype, a plant of an ae mutant is crossed with a plant having a du mutant and thereafter inbred to obtain a plant homozygous in aedu. After the homozygous aedu genotype is obtained, standard breeding techniques are used to obtain hybrid vigor. Hybrids are preferred because of their high starch yield compared to inbred lines. As is well-known to those in the art of corn processing, seed corn is different from the corn harvested for food. The method of crossbreeding plants and of obtaining specific genotypes in the offspring as well as breeding to obtain hybrid vigor is conventional.

The use of an aedu starch in food is disclosed in U.S. Pat. No. 4,790,997 issued Dec. 13, 1988. In that patent, the aedu starch is taught as an additive to canned foods to act as a thin-thick starch additive. It is surprising and unexpected that aedu starch improves the texture of a pasta product or tortilla.

The duh starch employed in this invention may be obtained from a starch bearing plant with a dull horny (duh) homozygous genotype. The term duh starch means not only starch obtained from a starch bearing plant that has a duh homozygous genotype duduhh but also translocations, inversions and other variants that contain or that can be described as containing the duh genotype.

Any plant source which produces edible starch and which can be crossbred to produce a plant having a duh homozygous genotype may be used. To date, it has been found that maize has the mutant horny (h) gene while the dull (du) gene is present in cereal grains such as maize, rice, barley and sorghum. Maize is the preferred plant source. The waxy gene is reported to be located on chromosome 9 of the maize chromosomes. See "Development Genetics," Volume 5, 1984, pages 1–24 The dull gene is reported to be located on chromosome 10 of the maize chromosomes while the horny gene is reported to be located on chromosome 3 in maize.

Generally, to obtain a starch bearing plant with double recessive mutants of the du and h genotype, a plant of a h mutant is crossed with a plant having a du mutant and thereafter inbred to obtain a plant homozygous in duh. After the homozygous duh genotype is obtained, standard breeding techniques are used to obtain hybrid vigor. Hybrids are preferred because of their high starch yield compared to inbred lines. As is well-known to those in the art of corn processing, seed corn is different from the corn harvested for food. The method of crossbreeding plants and of obtaining specific genotypes in the offspring as well as breeding to obtain hybrid vigor is conventional.

The use of duh starch in food is taught in U.S. Pat. No. 4,774,328 issued Sep. 27, 1988. In that patent, duh starch is taught as a canning starch in an acid environment. It is surprising and unexpected that duh starch improves the texture of a pasta product or tortilla.

Extraction of duh starch or the aedu starch from the plant is well known and, in the case of maize, typically entails a milling process, either dry or wet. Milling techniques to extract the starch from the plant are conventional.

The novel starch is preferably added in granular (native) form or is physically modified such as in a ground form like flour, meal or grits. The starch can also be a lightly chemically modified starch so long as the chemical modification does not interfere with the function of the starch in the pasta or tortilla. Good results have been obtained with the starch in either granular or flour form.

The flour component is preferably flour and includes such flours as all-purpose flour, conventional high amylose flour and durum wheat flour. Good results have been obtained with durum wheat flour. When a corn tortilla is made, the preferred flour component is corn masa.

In order to make a product in accordance with the present invention, a dough is formed comprising the flour component, water, and an effective amount of the novel starch. In the case of a pasta product, a whole egg or egg white can be added to the dough. In order to prepare the dough either the dry components are first mixed together until they are uniformly dispersed and then the water and/or egg component is added to the dry mix; or all ingredients are mixed together to form a uniform dough.

The amount of water and/or egg used to form the dough will vary depending on the pasta manufacturer. Generally, the amount of water used is up to about 30% by weight of farinaceous material in the dough. Egg is used in an amount up to about 70% by weight based on the weight of farinaceous material in the dough. Instead of whole egg, it is possible to use a combination of water and powdered egg. It is noted that when whole egg is used, the whole egg provides liquid to the dough.

Other ingredients can be added to the dough such as flavorings, seasonings, coloring, vitamins, minerals, vegetable solids or puree and preservatives.

Once the dough is made, it is shaped in any known conventional way into known conventional or unconventional shapes such as rods for spaghetti, conduits for macaroni, ribbons for noodles and pancakes for tortillas. After the dough is shaped it is cooked or dried. Dough shaped into a tortilla product is cooked while dough shaped into a pasta product is either dried or cooked. Drying and cooking of the shaped dough is done in any conventional manner. Typically, drying is conducted at room temperature. Cooking is done in a conventional manner using conventional equipment, in the case of a pasta product, for example, in a pot of salted boiling water for 20 minutes. After cooking, the pasta product is preferably drained and cooled. A tortilla product is typically cooked on a comal for about 0.5 minutes or in a gas fired oven.

In the case of pasta products intended for retorting, the dough is cooked for about five minutes and then cooled before mixing with sauce. The mixture of pasta product and sauce is then placed in a can or package for retorting. Such cooking is conventionally referred to as parboiling. It has been found upon heating the retorted pasta product made in accordance with the present invention that the pasta product maintains an al dente or firm texture even after heating.

In the case of pasta products intended for freezing, the dough is cooked for about 20 minutes and then cooled before mixing with sauce and placing in a package for freezing. It has been found upon heating the frozen pasta product made in accordance with the present invention that the pasta product maintains an al dente or firm texture even after heating. It has also been found that the pasta product made in accordance with the present invention is able to withstand the adverse condition of a steam table longer than conventional pasta formulations.

These and other aspects of the present invention may be more fully understood by reference to the following examples.

EXAMPLE 1

This example illustrates making a pasta product in accordance with the present invention and comparing it to pasta made only with durum wheat flour, a mix of durum wheat flour and granular common corn starch, and a mix of durum wheat flour and conventional high amylose corn starch, 50% amylose.

In order to prepare the various pasta products, a control containing 454.00 grams of durum wheat flour and 300.00 grams of whole egg was used. In order to test the various mixes containing common corn starch, conventional high amylose corn starch, aedu corn starch and duh corn starch, a portion of the durum wheat flour was replaced with the different corn starches in amounts ranging from 10% to 50%. Table 1 below details each of the specific formulations employed.

TABLE 1

Control 454.00 grams durum wheat flour
300.00 grams fresh egg

| | Starch (gr.) | Durum Wheat (gr.) | Egg (gr.) |
|---|---|---|---|
| Novel Starch (%)*1 | | | |
| 10 | 45.40 | 408.60 | 300.00 |
| 15 | 68.10 | 385.90 | 300.00 |
| 20 | 90.80 | 363.20 | 300.00 |
| 25 | 113.50 | 340.50 | 300.00 |
| 35 | 158.90 | 295.10 | 300.00 |
| 50 | 227.00 | 227.00 | 300.00 |
| Common (%)* | | | |
| 25 | 113.50 | 340.50 | 300.00 |
| High Amylose(%)* | | | |
| 25 | 113.50 | 340.50 | 300.00 |
| 35 | 158.90 | 295.10 | 300.00 |
| 50 | 227.00 | 227.00 | 300.00 |

*Percent by weight of combined durum wheat and starch.
[1]Two different formulations were made using the novel starch, one with aedu starch and another duh starch.

The common starch was a conventional common corn starch having an apparent amylose content of about 28% and a gelatinization temperature of about 70° C. The high amylose starch was a conventional high amylose corn starch having an apparent amylose content of about 50% and a gelatinization temperature of about 80° C. As is known to those of skill in the art, high amylose starch is aeae starch. The aedu starch was obtained from maize being homozygous in aedu and had an apparent amylose content of about 50% and a gelatinization temperature of about 70° C. while the duh starch was also obtained from maize being homozygous in duh and having an apparent amylose content of about 35% and a gelatinization temperature of about 70° C.

In order to make the pasta, 454.00 grams of durum wheat flour or 454.00 grams of a mixture of starch and durum wheat flour were placed into a bowl and a well was formed in the center. In the cases where starch was incorporated with the wheat flour, samples were mixed uniformly and then the well was formed in the center. Into the well 300.00 grams of egg were added and mixed slowly with a fork until moist to obtain a rough dough. The dough was then removed from the bowl and kneaded by hand on a tabletop surface until a uniform texture and color was achieved. The pasta dough was then formed into a dough ball and the dough ball was cut into thirds using a knife and was passed through a Deluxe Atlas Pasta Queen machine. The knob selector was regulated with each pass, starting at level one and progressing to level six. During the first pass the dough was folded in thirds, slightly dusted, and run through until a smooth dough sheet resulted. The dough sheet was then run through the machine at successively fine, higher settings. After the fifth level the dough sheet was cut in half with a knife and each was run through the sixth level. The dough sheets were slightly dusted with durum wheat flour and run through eleven ¼" pasta blades to form the final noodle product. The pasta noodles were then separated and air dried, overnight, at room temperature. The pasta was then cooked by adding it to boiling water containing 0.50 grams of salt for 20 minutes. At the end of the cooking the pasta was drained and rinsed with cold water and tested by a taste panel consisting of five (5) panelists.

In general, the panelists noted that the noodles made with common corn starch were mushy, while the noodles made with the high amylose corn starch, aeae corn starch, had a grainy mouth feel and a raw starch flavor which indicated that the starch had not been fully cooked out. The noodles made with the novel starch of the present invention had a somewhat firm, al dente texture. The 20% additions of aedu and duh starch were the best.

The individual results from the panelists comparing the flavor and texture of the different noodles to the control of 100% durum wheat are summarized in Table 2 below:

TABLE 2

| Sample | Texture | Flavor |
|---|---|---|
| aedu, 10% | tough, hard, rubbery | good, better than control (BTC) |
| aedu, 15% | tough, hard, rubbery | good, BTC |
| aedu, 20% | al dente, BTC | appealing, lighter than control |
| aedu, 25% | al dente, BTC | appealing, softer yellow than control |
| aedu, 35% | tender, soft | good |
| aedu, 50% | soft, mushy | good |
| duh, 10% | tough | good, BTC |
| duh, 15% | tough | appealing |
| duh, 20% | al dente | good, BTC |
| duh, 25% | tender | good, BTC |
| duh, 35% | softer than control | good |
| duh, 50% | soft, mushy | good |
| common, 25% | mushy | gritty |
| aeae, 25% | tough | starchy |
| aeae, 25% | tough | starchy |
| aeae, 50% | tough | starchy |

EXAMPLE 2

This example illustrates first cooking noodles made in accordance with Example 1 above, freezing the noodles with an alfredo sauce and then reheating the noodles and alfredo sauce in a microwave oven.

The noodles were made in accordance with Example 1 above with the following starch formulations: 25% by weight aedu starch, 35% by weight aedu starch, 25% by weight duh starch and 35% by weight duh starch. Each set of noodles was cooked for 20 minutes in salted water as described in Example 1 above. Then 170.0 grams of noodles were mixed with 63.75 grams of a conventional alfredo sauce and the mixture was placed in a plastic bag and frozen at 0° C. for 14 days. Then the bags of frozen noodles and alfredo sauce were heated in a microwave oven set at high power (750 watts) for four minutes.

Once heated, the noodles were tested by a taste panel that found them to be al dente with nice, firm texture and excellent mouth feel and flavor.

EXAMPLE 3

This example illustrates first cooking noodles made in accordance with Example 1 above, freezing the noodles with a tomato-based sauce, i.e. an acid environment, and then reheating the noodles and tomato sauce in a microwave oven.

The noodles were made in accordance with Example 1 above with the following starch formulations: 15% by weight aedu starch, 20% by weight aedu starch, 25% by weight aedu starch, 15% by weight duh starch, 20% by weight duh starch and 25% by weight duh starch. Each set of noodles was cooked for 20 minutes in salted water as described in Example 1 above. Then 100.0 grams of noodles were mixed with 90.0 grams of a conventional tomato sauce and the mixture was placed in a plastic bag and frozen at 0° C. for 14 days. Then the bags of frozen noodles and tomato sauce were heated in a microwave oven set at high power (750 watts) for 2.5 minutes.

Once heated, the noodles were tested by a taste panel that found them to be al dente with nice, firm texture and excellent mouth feel and flavor.

EXAMPLE 4

This example illustrates the differences between starch obtained from maize which is of the aedu genotype and duh genotype compared to conventional high amylose corn starch, aeae genotype, and common corn starch.

Starch may be characterized as a polymer made from alpha-D-glucose monomers. The polymer is formed through biosynthesis in plants and, hence, is more accurately referred to as a biopolymer. Acetal linkages form the bonds between the monomers and there are, to date, only two known covalent bonds formed between the monomers during biosynthesis, alpha 1-4 and alpha 1-6. Traditionally, the alpha 1-6 linkage has been referred to as being a branch point for the polymer.

Commercially, there have been four varieties of corn starch available: waxy, common, and two varieties of conventional high amylose, one having an apparent amylose content of 50% and the other having an apparent amylose content of 70%. Waxy corn starch is homozygous in the waxy gene, wx, while the high amylose corn starch is homozygous in the amylose extender gene, ae. Traditionally, high amylose corn starch contained the recessive gene ae because there was no dominant amylose extender gene; however, U.S. Pat. No. 5,004,864 now discloses that a dominant high amylose gene has been discovered.

Traditionally, one of the features used to distinguish starches was amylose content as determined by an assay with iodine, i.e. apparent amylose content. Amylose was defined as an alpha-D-glucose polymer containing only alpha 1-4 linkages. Waxy starch was considered to contain no measurable amylose but only amylopectin which had been defined as a polymer of alpha-D-glucose containing both alpha 1-4 and alpha 1-6 linkages. Common corn starch was reported to have an apparent amylose content of 27%.

It had also been conventional wisdom that gelatinization temperature was directly related to the amylose content of the starch; however, Table 4 below illustrates that the gelatinization temperature and apparent amylose content are not necessarily directly related:

TABLE 4

| Starch | Apparent Amylose (%) | Gelatinization Temp. (°C.) |
|---|---|---|
| Common | 27.0 | 70.8 |
| aeae (50%) | 50.9 | 78.6 |
| aeae (70%) | 65.5 | 80.0 |
| aedu | 47.0 | 69.3 |
| duh | 33.3 | 69.8 |

The common corn starch, aeae (50%) and aeae (70%), are conventional products. The aeae (50%) was a conventional high amylose corn starch having an apparent amylose content of about 50%. The aeae (70%) was a conventional high amylose corn starch having an apparent amylose content of about 70%.

The gelatinization temperature is a mean value determined from a random sampling of product. The gelatinization temperature was measured using a scanning calorimeter manufactured by Mettler Model No. 300 using a 30% solid starch sample in sealed aluminum pans following the procedure outlined in the owner's manual for that model.

The 99% confidence interval for the gelatinization temperature for the common starch was 68.7 to 72.7. The 99% confidence interval for the gelatinization temperature for the aeae (50%) and aeae (70%) respectively was 72.8 to 84.4 and 73.1 to 90.8. Both the aeae (50%) and aeae (70%) were grown in native maize.

The gelatinization temperatures for both the duh starch and the aedu starch were averages taken for two samples of each starch. One sample was grown in an Ohio 43 dent corn background which was homozygous for aedu genotype while the other was from a dent corn background of W64A which was homozygous for aedu genotype. Both samples of duh starch were obtained from a dent corn hybrid of W64A and Ohio 43.

Another method for characterizing the biopolymer is to analyze that portion of the polymer that is made up of only alpha 1-4 linked alpha-D-glucose. Such an analysis is done by subjecting the starch to an enzyme which hydrolyzes all alpha 1-6 linkages but has no effect on the alpha 1-4 linkages. Isoamylase is such an enzyme.

FIG. 1 illustrates the molecular weight distribution of aedu starch, duh starch, aeae (50%) and aeae (70%) after the starch has been debranched by the enzyme. As can be seen in FIG. 1, the duh and aedu starches had a portion with a larger molecular weight than either the aeae (50%) or aeae (70%). It can also be seen that the aedu and duh starches had two distinct peaks while aeae (50%) and aeae (70%) did not. This implies that both the branched and the debranched portions of the aedu and duh starch are substantially different from both the branched and debranched portions of the conventional high amylose starches. Those of skill in the art will recognize that the molecular weight and branching of the polymer have substantial impact on the way it behaves.

Table 5 below lists the various molecular weights for the S1 sample:

TABLE 5

| Sample | Apparent Amylose (%) | % Area | S1 Av. M.W. | Av. D.P. |
|---|---|---|---|---|
| aedu | 47.0 | 45.1 | 170,353 | 1051 |
| duh | 33.3 | 31.1 | 176,921 | 1092 |
| aeae (50%) | 50.9 | 30.4 | 119,112 | 735 |
| aeae (70%) | 65.5 | 33.9 | 120,264 | 742 |

These data were developed using multiple samples on a statistical basis.

In order to test each sample, the starches were first defatted by refluxing with an 85% methanol/water solution for 20 hours. The percent of apparent amylose for tables 4 and 5 was determined by using standard colorimetric iodine procedures wherein the starch is first gelatinized with sodium hydroxide and then reacted with an iodine solution and the resulting sample is measured using a spectrophotometer in a 1 cm cell at 600 nm against a blank of 2% iodine solution.

Each starch sample was debranched by subjecting a slurry of gelatinized starch to isoamylase for a period of twenty hours under conventional conditions so as to fully hydrolyze all of the alpha 1-6 linkages. The polyalpha-1-4-D-glucose was collected and subjected to high performance liquid chromatography using a size exclusion medium, specifically Ultrahydrogel ™ Linear. The HPLC-SEC was run in a conventional manner using conventional equipment to obtain the graphs shown in FIG. 1 and to obtain the results reported in Table 5 above.

In FIG. 1, graph A is the aedu corn starch, graph B is the duh corn starch, graph C is the aeae corn starch, 50% apparent amylose and graph D is the aeae corn starch, 70% apparent amylose. Comparing the gelatinization temperatures and the graphs in FIG. 1, it is apparent that the biopolymers of these four starches are different and that the iodine test for apparent amylose has no relationship to the chemical structure of the biopolymer.

EXAMPLE 5

This example illustrates the difference between a corn tortilla made in accordance with the present invention and one with a conventional formulation. The following formulations were used:

TABLE 6

| Ingredients | Present Invention (% by Weight) 1 | 2 | 3 | Conventional (% by Weight) |
|---|---|---|---|---|
| Masa | 40.20 | 40.20 | 40.20 | 50.20 |
| duh, granular | 10.00 | — | — | — |
| aedu, granular | — | 10.00 | — | — |
| aedu, flour | — | — | 10.00 | — |
| Corn oil | 2.50 | 2.50 | 2.50 | 2.50 |
| Water | 47.31 | 47.31 | 47.31 | 47.31 |

In order to make each set of corn tortillas, a uniform dough was formed using a Hobart mixer for each of the above formulations. Then tortillas were formed using 45 grams of dough and cooked on each side for 30 seconds using a comal.

The masa was conventional corn masa. The duh and aedu starches were obtained from corn and were in either the granular or flour form as indicated. The corn oil was conventional and warm water was in the formulation.

It was found that the tortillas made in accordance with the present invention were more pliable than the conventional corn tortillas.

Next, a filling of browned, ground beef and seasonings was prepared and each tortilla was filled, sprinkled with grated cheese and placed in a freezer at 0° C. for at least two weeks. After two weeks at 0° C., the frozen filled tortillas were heated in a microwave oven set at high (750 watts) for three minutes and taste tested by a panel of six testers.

The tortilla of the present invention remained pliable and did not become soggy or mushy upon heating in the microwave. In contrast, the filled tortillas made from the conventional formulation became soggy and mushy on the bottom and brittle and cracked where the shell was not in contact with the filling or the cheese.

EXAMPLE 6

This example illustrates making lasagna noodles in accordance with the present invention and compares the noodles made in accordance with the present invention to lasagna noodles made from a conventional formulation. The following formulations were used:

TABLE 7

| Ingredients | Present Invention (% by weight) 1 | 2 | Conventional (% by weight) |
|---|---|---|---|
| Wheat, flour | 40.00 | 40.00 | 60.00 |
| duh, granular | 20.00 | — | — |
| aedu, granular | — | 20.00 | — |
| Water | 40.00 | 40.00 | 40.00 |

Using the same procedure as outlined in Example 1, about 45 grams of a dough was formed and lasagna noodles were cut from the dough. Once the noodles were formed, they were all frozen at 0° C. for seven days. Using the frozen noodles and a conventional meat sauce and cheese, a lasagna was made using each of the three separate sets of noodles and then cooked in a conventional oven in a conventional manner.

Durum wheat flour was used in the formulation while the duh and aedu starches were obtained from corn. The duh and aedu starches were in granular form.

The cooked lasagna was tested by a taste panel and the taste panel preferred the lasagna made in accordance with the present invention to the lasagna made with conventional noodles. The taste panel found that the noodles made in accordance with the present invention were al dente while the conventional noodles were soft and overcooked.

Example 7

This example illustrates making a flour tortilla in accordance with the present invention and compares the flour tortilla made in accordance with the present invention to a flour tortilla made with a conventional formulation. The following formulation was used to make the flour tortillas:

TABLE 8

| Ingredient | Present Invention (% by weight) 1 | 2 | Conventional (% by weight) |
|---|---|---|---|
| Wheat, flour | 62.65 | 62.65 | 72.65 |
| duh, granular | 10.00 | — | — |

TABLE 8-continued

| Ingredient | Present Invention (% by weight) 1 | 2 | Conventional (% by weight) |
|---|---|---|---|
| aedu, granular | — | 10.00 | — |
| Baking soda | 1.71 | 1.71 | 1.71 |
| Salt, NaCl | 0.68 | 0.68 | 0.68 |
| Water | 24.96 | 24.96 | 24.96 |

In order to make the flour tortillas, the dry components were first mixed in a Hobart mixer and then the liquid components were added and a dough was made. Tortillas were formed using 45 g dough balls which were pressed into tortillas and then cooked on each side for 30 seconds using a comal.

The wheat flour was conventional wheat flour and the baking soda and salt were also from conventional sources. The duh and aedu starches were from corn and in the granular fo: n. Warm water was used in the formulation.

It was found that the tortillas made in accordance with the present invention were more pliable than the conventional flour tortillas.

Next, a filling of browned, ground beef and seasonings was prepared and each tortilla was filled, sprinkled with grated cheese and placed in a freezer at 0° C. for at least two weeks. After two weeks at 0° C., the frozen, filled tortillas were heated in a microwave oven set at high (750 watts) for 3 minutes and taste tested by a panel of six testers.

The tortilla of the present invention remained pliable and did not become soggy or mushy upon heating. In contrast, the filled tortillas made from the conventional formulation became soggy and mushy on the bottom and brittle and cracked where the shell was not in contact with the filling or the cheese.

It will be understood that the claims are intended to cover all changes and modifications of the preferred embodiments of the invention herein chosen for the purpose of illustration which do not constitute a departure from the spirit and scope of the invention.

What is claimed is:

1. In a product selected from the group consisting of a pasta product or a tortilla which is prepared from a dough comprising a farinaceous material and water, the improvement comprising replacing a portion of said farinaceous material with an effective amount of a novel starch selected from the group consisting of aedu starch, duh starch and a mixture thereof, the amount being effective to improve the texture of the product.

2. The product of claim 1 wherein the effective amount of the novel starch is about 5% to about 50% by weight of farinaceous material.

3. The product of claim 1 wherein the novel starch is either in the native form, chemically modified or physically modified.

4. The product of claim 1 wherein the effective amount of the novel starch is about 10% to about 40% by weight of farinaceous material.

5. The product of claim 1 wherein the effective amount of the novel starch is about 15% to about 25% by weight of farinaceous material.

6. The product of claim 1 wherein the dough comprises up to about 30% water; about 5 to 50% of said novel starch; and 95 to 50% flour component.

7. The product of claim 1 wherein said dough further comprises an egg in an amount of up to about 70% by weight farinaceous material.

8. The product of claim 1 wherein the pasta product is selected from the group consisting of spaghetti, macaroni and noodles.

9. The product of claim 1 wherein the flour component is a wheat flour.

10. The product of claim 1 wherein the novel starch is added in granular form or in a ground form.

11. A process for making a product selected from the group consisting of a pasta product or a tortilla, said process comprising the steps of:
   (a) forming a dough comprising a farinaceous material and water, said farinaceous material comprising a flour component, and an effective amount of a novel starch selected from the group consisting of aedu starch, duh starch and a mixture thereof, the amount being effective to improve the texture of the cooked pasta product; and
   (b) cooking said dough to produce the product.

12. The process of claim 11 wherein the effective amount of novel starch is about 5% to about 50% by weight of farinaceous material.

13. The process of claim 11 wherein the effective amount of novel starch is about 10% to about 40% by weight of farinaceous material.

14. The process of claim 11 wherein the effective amount of the novel starch is about 15% to about 25% by weight of farinaceous material.

15. The process of claim 11 wherein cooking is accomplished in an oven.

16. The process of claim 11 wherein cooking is done in boiling water.

17. The process of claim 11 wherein the novel starch is obtained from maize.

* * * * *

UNITED STATES PATENT AND TRADEMARK OFFICE
CERTIFICATE OF CORRECTION

PATENT NO. : 5,397,586
DATED : March 14, 1995
INVENTOR(S) : Susan L. Furcsik et al.   Page 1 of 2

It is certified that error appears in the above-indentified patent and that said Letters Patent is hereby corrected as shown below:

Column 2, line 9, change "dense" to --dente--;
line 16, change "on" to --an--.

Column 3, line 43-45, delete "The waxy gene is reported to be located on chromosome 9 of the maize chromosomes. See "Development Genetics," Volume 5, 1984, pages 1-24.";
line 48, at the end of the paragraph, insert --See "Development Genetics," Volume 5, 1984, pages 1-24.--.

Column 4, line 61, after "found" insert --that,--;
line 63, after "invention" insert --,--; delete "that";
line 68, after "found", insert --that,--.

Column 5, line 2, after "invention" insert --,--; delete "that".

Column 6, line 58, change "25%" to --35%--.

Column 9, line 35, change "A" to --1--; change "B" to --2--;
line 36, change "C" to --3--; line 37, change "D" to --4--.

Column 11, line 46 (claim 1), change "or" to --and--.

Column 12, lines 13-15 (claim 6), amend claim 6 to read as follows:

6. The product of claim 1 wherein the dough comprises water in an amount up to about 30% by weight farinaceous material; novel starch in an amount of about 5% to about 50% by weight farinaceous material; and a flour component in an amount of about 95% to about 50% by weight farinaceous material.

UNITED STATES PATENT AND TRADEMARK OFFICE
CERTIFICATE OF CORRECTION

PATENT NO. : 5,397,586

DATED : March 14, 1995

INVENTOR(S) : Susan L. Furcsik et al.

It is certified that error appears in the above-indentified patent and that said Letters Patent is hereby corrected as shown below:

Column 12, line 27 (claim 11), change "or" to --and--.

Column 12, line 31 (claim 11), after "component" delete ",".

Signed and Sealed this

Thirteenth Day of June, 1995

Attest:

BRUCE LEHMAN

*Attesting Officer*     *Commissioner of Patents and Trademarks*